UNITED STATES PATENT OFFICE.

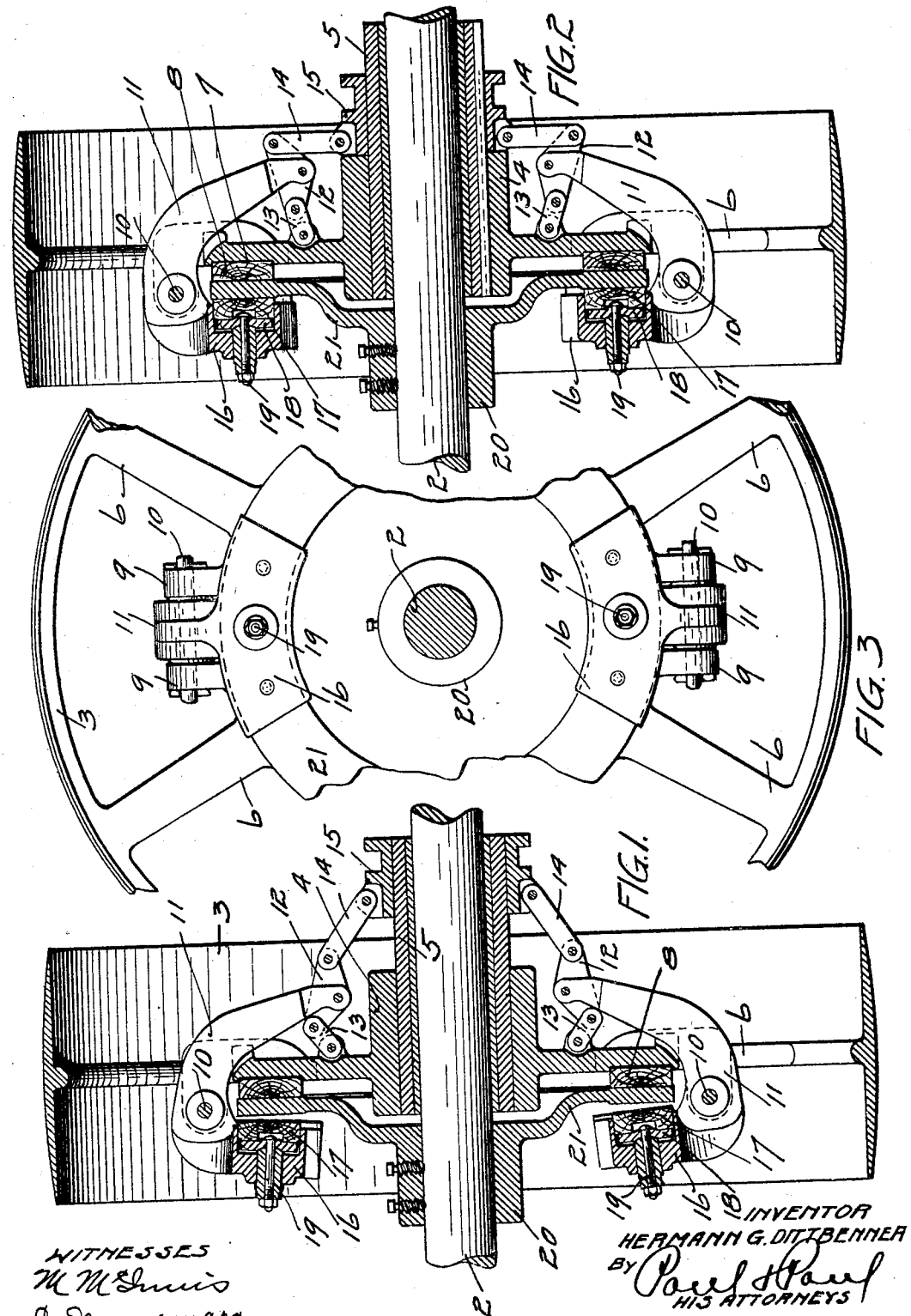

HERMANN G. DITTBENNER, OF MINNEAPOLIS, MINNESOTA, ASSIGNOR TO DIAMOND IRON WORKS, A CORPORATION OF MINNESOTA.

FRICTION-CLUTCH.

No. 808,975.   Specification of Letters Patent.   Patented Jan. 2, 1906.

Application filed August 29, 1904. Serial No. 222,500.

*To all whom it may concern:*

Be it known that I, HERMANN G. DITTBENNER, of Minneapolis, Hennepin county, Minnesota, have invented certain new and useful Improvements in Friction-Clutches, of which the following is a specification.

My invention is designed as an improvement over the clutch shown and described in Letters Patent of the United States, No. 482,326, issued September 6, 1892, to William W. Wilkinson.

The object of my invention is to provide means for operating the bearing-blocks which will cause them to move slowly and positively when near the gripping-surfaces and engage them with such force that all danger of slipping will be avoided.

A further object is to provide an operating mechanism which cannot through centrifugal force be accidentally thrown to a locked position.

The invention consists generally in interposing a toggle mechanism between the block-carrying arms and a sliding sleeve through the movement of which the arms are operated.

In the accompanying drawings, forming part of this specification, Figure 1 is a sectional view showing the clutch mechanism in its unlocked or inoperative position. Fig. 2 is a similar view showing the clutch in its locked position. Fig. 3 is a detail view showing the manner of supporting the block-carrying arms on the pulley.

In the drawings, 2 represents a shaft, and 3 a pulley, having a hub 4, splined on a sleeve 5, that is loosely journaled on said shaft. The spokes 6 of said pulley are provided with an annular recess 7, wherein wood bearing-blocks 8 are secured. Near these blocks the spokes are provided with lugs 9, wherein pins 10 are mounted and form pivots for arms 11, arranged upon opposite sides of the pulley-hub, as shown in Fig. 3. These arms have bearings on the pins 10 near one end, and their other ends extend between the spokes of the pulley to the opposite side thereof and are pivoted between plates 12, that are connected at one end by short links 13 with the spokes 6. The plates 12 are pivoted intermediate to their ends on the arms 11, and links 14 pivotally connect the other ends of the plates opposite the links 13 with a sleeve 15, that is also splined on the sleeve 5 and is adapted to slide lengthwise thereof. The plates 12 and the links 13 and 14 form a toggle-joint connection between the arms 11 and the sleeve 15, and the ends of the links 13 engage the arms when the clutch is unlocked and limits the outward movement of the sliding sleeve 15 and renders the use of a stop unnecessary. As the sleeve 15 is moved toward the hub 4 the speed of movement of the toggle and the bearing-blocks will gradually decrease, and as the bearing-blocks approach the surface to be gripped their movement will be comparatively slow, while the leverage exerted thereon through the links 13 and the plates 12 will be correspondingly increased, and hence when the blocks contact with the surface to be gripped they will be held with such force that all danger of slipping of the clutch will be avoided. When the clutch is in its unlocked position, the parts will be as shown in Fig. 1, with the links 14 at an angle with respect to the shaft 2, and the centrifugal force will not have a tendency to cause the accidental locking of the clutch. When the sleeve 15 is moved inward toward the hub 4, the links 14 will gradually assume a vertical position or one substantially at right angles to the shaft 2, and in this position the revolution of the pulley will not cause the premature locking of the clutch. As the outer ends of the plates 12 are raised their inner ends are drawn downward and the arms 11 swung outward until the pivots of the links 11 and the connection of the plates 12 with the links 14 are substantially in line, when the toggle will be locked and cannot be accidentally moved to release the clutch until the sleeve 15 has been moved outwardly on the shaft away from the hub of the pulley. The sleeve 15 will contact with the pulley-hub at the limit of its inward movement, but will extend a sufficient distance outside the circumference of the pulley to allow the convenient use of a shipper-rod.

Upon the pivoted end of the arms 11 I provide jaws 16, carrying wood gripping-blocks 17, that are secured to metal followers 18, loosely mounted in said jaws upon bolts 19, and hub 20, rigidly secured on the shaft 2, has a disk 21, that extends between the blocks 7 and 17 and is gripped firmly between the same when the arms 11 are operated to lock the clutch. This arrangement of the wood bearing-blocks and the disk 21 is almost identical with that shown and described in the Letters Patent above referred to, and I therefore make no claim to the same herein, nor is a further detailed description necessary.

The operation of the clutch is as follows: The sleeve 15 being moved toward the pulley-hub by the shipper-rod, (not shown,) the links 14 will be swung to a position substantially at right angles to the sleeve 5, and as they approach such position the speed of the arms 11 will gradually decrease, while the leverage thereon and on the gripping-blocks is rapidly increased. The effect of this construction is to cause a very firm positive seating of the bearing-blocks upon the surface of the disk, insuring a perfect frictional connection and avoiding all slipping. As soon as the toggle connection between the plates 12 and the pulley-spoke is straightened the bearing-blocks will have reached the limit of their movement and will be locked and prevented from any outward movement until the toggle-joint is broken. When it is desired to release the clutch, the sleeve 15 is moved away from the pulley-hub, the links 14 withdraw into their normal inclined position, and the joint between the plates 12 and 13 is broken to allow the arms 11 to be swung inward and the bearing-blocks to leave the surface of the disk.

I claim as my invention—

1. The combination, with a shaft, of a loose pulley thereon, a member fixed on said shaft and having a surface to be gripped, arms pivoted on said pulley and provided with gripping-blocks to engage said member, a sliding sleeve, plates pivotally connected intermediate to their ends on said arms, and links pivotally connecting the ends of said plates with said pulley and said sleeve, the links between said plates and sleeve being substantially at right angles to the latter when the clutch is locked.

2. In a friction-clutch, the combination, with a pulley, of the pivoted arms 11 thereon, a clutch member plates 12 having a pivotal connection with said arms, links 13 connecting one end of said plates with said pulley, a sliding sleeve, and links 14 connecting said sleeve with the other ends of said plates, the pivots of the links 13 and the pivotal point of the links 14 on the plates 12 being substantially in line when the parts are in their locked position, substantially as described.

3. The combination, with a shaft, of a loose pulley thereon, a friction-disk fixed on said shaft and having a gripping-surface, arms pivoted on said pulley and provided with gripping-blocks, a sliding sleeve, links connecting said arms with said sleeve and with a fixed pivot on said pulley, the links connecting said arms with said sleeve exerting an outward drawing action on said arms, and the links connecting said arms with said fixed pivot exerting an outward thrust on said arms during their final movement to seat said blocks, substantially as described.

4. The combination, with a shaft, of a loose pulley thereon, a friction-disk fixed on said shaft and having a gripping-surface, arms pivoted on said pulley and provided with gripping-blocks, a sliding sleeve, plates pivoted at points intermediate to their ends on said arms, links connecting the ends of said plates with said sliding sleeve and with fixed pivots on said pulley, the links connecting said plates with said sleeve exerting an outward drawing action on said arms, and the links connecting said plates and said fixed pivots exerting an outward pushing or thrusting action on said arms during their final movement.

5. The combination, with a shaft and a loose pulley thereon, a friction-disk fixed on said shaft, arms pivoted on said pulley and having gripping-blocks to engage said disk, a sliding sleeve, links connecting said arms with said sleeve and with fixed pivots on said pulley, and the links connecting said arms and said fixed pivots serving as stops for said arms when in their inoperative position, substantially as described.

6. In a friction-clutch, the combination, with a revolving member, of a clutch member, arms pivoted on said revolving member and having gripping-blocks to engage said clutch member, a sliding sleeve, toggle mechanisms connecting said arms with said sleeve and with a fixed pivot, the toggle between said arms and said sleeve exerting an initial drawing action on said arms and the toggle between said arms and said fixed pivot supplementing the action of said sleeve-toggle by exerting a final outward thrust on said arms, and the connection of said arms with said toggle mechanisms being between their connections with said sleeve and said fixed pivot, substantially as described.

In witness whereof I have hereunto set my hand this 24th day of August, 1904.

HERMANN G. DITTBENNER.

In presence of—
RICHARD PAUL,
C. MACNAMARA.